UNITED STATES PATENT OFFICE.

GÉZA AUSTERWEIL, OF NEUILLY, NEAR PARIS, FRANCE.

PROCESS FOR REGENERATING AND DEVULCANIZING INDIA-RUBBER OR CAOUTCHOUC AND EXTRACTION OF CAOUTCHOUC FROM RAW MATERIALS CONTAINING CAOUTCHOUC.

961,395.     Specification of Letters Patent.     Patented June 14, 1910.

No Drawing.     Application filed November 11, 1908. Serial No. 462,025.

*To all whom it may concern:*

Be it known that I, GÉZA AUSTERWEIL, chemist, subject of the King of Hungary, residing at 118 Boulevard Bineau, Neuilly, near Paris, in the Republic of France, have invented certain new and useful Improvements in Processes for Regenerating and Devulcanizing India-Rubber or Caoutchouc and Extraction of Caoutchouc from Raw Materials Containing Caoutchouc, of which the following is a full, clear, and exact description.

The regeneration and devulcanization of waste caoutchouc by means of terpineols or oxidized terpenes is well known (see French Patent No. 370,619, Tixier). I have found that the terpene hydrocarbon limonene, including both the optically active varieties and the inactive modification dipentene, may be advantageously employed, both for recovering waste rubber and for treating the primary caoutchouc-bearing materials. The improved technical action results from the fact that limonene is a simple homologue of caoutchouc, and dissolves it better than the oxidized hydrocarbons.

The complete process is characterized by the following steps: Vulcanized caoutchouc, caoutchouc scrap, or caoutchouc-containing raw material, is treated with an excess of limonene, 4 or 5 parts by weight being preferably employed. For the purpose of forming a solution, the mixture of the caoutchouc with limonene is heated for an hour under pressure to a temperature of about 120° C., or without pressure to the boiling point of the limonene, and then cooled. The solution is then freed by decantation from the insoluble residue, and is preferably treated with a light aromatic hydrocarbon such for example as benzene or toluene or the like. This mixture is then allowed to stand for some time, is decanted afresh, and the solution is treated with a suitable caoutchouc precipitant, such as a primary alcohol of the fatty series, or acetone. The precipitated caoutchouc is washed with warm water and dried at about 100° C., and has all the characteristic features of natural caoutchouc.

The process is facilitated by allowing the caoutchouc to stand for a suitable time in limonene, thus causing it to swell.

The term limonene, as used in the claims, is intended to include its optically inactive form, dipentene.

I claim:—

1. The process of regenerating and devulcanizing caoutchouc-waste or scrap, and of extracting natural caoutchouc from raw materials, which consists in treating the material with limonene.

2. The process of recovering caoutchouc from caoutchouc-waste or scrap and raw materials, which consists in treating the material with an excess of limonene, decanting off the undissolved residues, precipitating by means of a suitable caoutchouc precipitant, washing and drying.

3. The process of recovering caoutchouc from caoutchouc-waste or scrap and raw materials, which consists in treating the material with an excess of limonene, decanting off the undissolved residues, treating with light, aromatic hydrocarbons, and after frequent decantation precipitating by means of a suitable caoutchouc precipitant, washing and drying.

In witness whereof, I subscribe my signature, in presence of two witnesses.

GÉZA AUSTERWEIL.

Witnesses:
    MAX HERZENBERG,
    H. C. COXE.